US009795944B2

(12) United States Patent
Kamimura et al.

(10) Patent No.: US 9,795,944 B2
(45) Date of Patent: Oct. 24, 2017

(54) POROUS SILICA-CARBON COMPOSITES AND A METHOD OF PRODUCING THE SAME

(75) Inventors: Mitsuhiro Kamimura, Kasugai (JP); Kazunori Nobuhara, Kasugai (JP); Kanae Nobuhara, legal representative, Nagoya (JP); Takuya Nobuhara, legal representative, Sumida-ku (JP); Mai Nobuhara, legal representative, Sumida-ku (JP)

(73) Assignee: FUJI SILYSIA CHEMICAL LTD., Kasugai-shi, Aichi (JP)

( * ) Notice: Subject to any disclaimer, the term of this patent is extended or adjusted under 35 U.S.C. 154(b) by 311 days.

(21) Appl. No.: 14/342,991

(22) PCT Filed: Sep. 6, 2012

(86) PCT No.: PCT/JP2012/072757

§ 371 (c)(1), (2), (4) Date: Nov. 6, 2014

(87) PCT Pub. No.: WO2013/035790

PCT Pub. Date: Mar. 14, 2013

(65) Prior Publication Data

US 2015/0072145 A1 Mar. 12, 2015

(30) Foreign Application Priority Data

Sep. 7, 2011 (JP) ................................ 2011-195274

(51) Int. Cl.

| | |
|---|---|
| ***B01J 21/18*** | (2006.01) |
| ***H01M 4/48*** | (2010.01) |
| ***C01B 33/143*** | (2006.01) |
| ***C01B 33/146*** | (2006.01) |
| ***B01J 21/08*** | (2006.01) |
| ***H01M 4/62*** | (2006.01) |
| ***C04B 35/14*** | (2006.01) |
| ***C04B 38/00*** | (2006.01) |
| ***C04B 35/624*** | (2006.01) |
| *C04B 111/00* | (2006.01) |

(52) U.S. Cl.

CPC ............... *B01J 21/18* (2013.01); *B01J 21/08* (2013.01); *C01B 33/143* (2013.01); *C01B 33/146* (2013.01); *C04B 35/14* (2013.01); *C04B 35/624* (2013.01); *C04B 38/0045* (2013.01); *H01M 4/48* (2013.01); *H01M 4/483* (2013.01); *H01M 4/625* (2013.01); *C04B 2111/0081* (2013.01); *C04B 2111/00853* (2013.01); *C04B 2235/424* (2013.01); *Y10T 428/2982* (2015.01)

(58) Field of Classification Search

None

See application file for complete search history.

(56) References Cited

U.S. PATENT DOCUMENTS

| | | | | |
|---|---|---|---|---|
| 5,807,494 | A * | 9/1998 | Boes | B01D 69/141 106/472 |
| 6,107,350 | A | 8/2000 | Boes et al. | |
| 6,375,735 | B1 * | 4/2002 | Stephens | C01B 33/143 106/406 |
| 2005/0260118 | A1 * | 11/2005 | Lu | B01D 53/228 423/445 R |
| 2006/0057352 | A1 | 3/2006 | Ichiki et al. | |
| 2006/0116284 | A1 | 6/2006 | Pak et al. | |
| 2009/0209418 | A1 * | 8/2009 | Watanabe | B01J 20/103 502/405 |
| 2011/0281205 | A1 | 11/2011 | Pak et al. | |
| 2012/0077006 | A1 * | 3/2012 | Worsley | C04B 35/83 428/219 |
| 2013/0052117 | A1 * | 2/2013 | Imai | C01B 37/02 423/335 |
| 2013/0281291 | A1 | 10/2013 | Pak et al. | |

FOREIGN PATENT DOCUMENTS

| | | | |
|---|---|---|---|
| CN | 1173144 | A | 2/1998 |
| CN | 1781604 | A | 6/2006 |
| JP | 2000-251896 | A | 9/2000 |
| JP | 2003221220 | A | 8/2003 |
| JP | 2005298321 | | 10/2005 |
| JP | 2006131499 | A | 5/2006 |
| JP | 2007220411 | A | 8/2007 |

(Continued)

OTHER PUBLICATIONS

Chinese Office Action for Application No. 201280043355.8 dated Sep. 8, 2015.

International Search Report (Form PCT/ISA/210) dated Oct. 9, 2012, corresponding to International Application No. PCT/JP2012/072757.

International Preliminary Report on Patentability for International Application No. PCT/JP2012/072757 dated Mar. 12, 2014.

(Continued)

*Primary Examiner* — Guinever S Gregorio

(74) *Attorney, Agent, or Firm* — Jenkins, Wilson, Taylor & Hunt, P.A.

(57) ABSTRACT

Porous silica-carbon composites are obtained by mixing fine particulate carbon dispersed in water by a surfactant, alkali metal silicate aqueous solution, and mineral acid so as to produce co-dispersion in which silica hydrosol, produced by reaction of the alkali metal silicate and the mineral acid, and the fine particulate carbon are uniformly dispersed, and gelling silica hydrosol, contained in the co-dispersion, and making the co-dispersion into porous bodies. The porous silica-carbon composites are prepared so as to have specific surface area from 20 to 1000 $m^2/g$, pore volume from 0.3 to 2.0 ml/g, and average pore diameter from 2 to 100 nm.

5 Claims, No Drawings

(56) References Cited

FOREIGN PATENT DOCUMENTS

| | | | |
|---|---|---|---|
| WO | WO-96/18456 | A2 | 6/1996 |
| WO | WO 01/74712 | A1 | 10/2001 |

OTHER PUBLICATIONS

Japanese Office Action for Application No. JP 2011-195274 dated Mar. 21, 2013.

Extended European Search Report for Application No. 12829719.9 dated May 8, 2015.

Chinese Office Action for Application No. 201280043355.8 dated Jan. 7, 2015.

* cited by examiner

POROUS SILICA-CARBON COMPOSITES AND A METHOD OF PRODUCING THE SAME

CROSS-REFERENCE TO RELATED APPLICATION

This application is filed under the provisions of 35 U.S.C. §371 and claims the priority of International Patent Application No. PCT/JP2012/072757 filed on Sep. 6, 2012, and of Japanese patent application No. 2011-195274 filed on Sep. 7, 2011. The disclosures of the foregoing international patent application and Japanese patent application are hereby incorporated by reference herein in their respective entireties.

TECHNICAL FIELD

Silica porous material, such as silica gel and mesoporous silica, are frequently used as an absorbent or a catalyst carrier for industrial purposes due to the high specific surface area thereof. The present invention is related to a material in which silica porous bodies are provided with conductive properties so as to improve the features thereof. The material is excellent in application particularly to a battery material and a catalyst carrier.

BACKGROUND ART

In battery materials, such as lead-acid batteries and lithium secondary batteries, development of electrode materials that have high capacities, accept a high current, and allow quick recharge has been attempted by way of making electrode materials into porous configurations and increasing the specific surface area so that active materials are effectively utilized and lithium is more rapidly diffused within electrodes.

For the electrically-conductive materials used for electrodes of secondary batteries, usage of electrically-conductive materials consisting primarily of silica and carbon has been already suggested. For example, Patent Document 1, to be explained below, discloses silica powder on which acetylene black is supported.

In the technique described in Patent Document 1, an expected type of acetylene black-supported silica is produced by: adding acetylene black in purified water so as to be suspended therein; adding and mixing silica powder in the suspension so that acetylene black is adsorbed on the surface of the silica powder; and evaporating the water.

Moreover, a method of obtaining composites of silicon dioxide and an electrically-conductive substance has been also considered, wherein tetramethoxysilane oligomer, phenolic resin, graphite particles, and so on are used as starting materials (see Patent Document 2).

In the technique described in Patent Document 2, expected composites are obtained as follows: tetramethoxysilane oligomer, phenolic resin, and methanol are mixed, and then graphite particles are added to the mixture; while distilling methanol, the mixture is heated to a predetermined temperature and maintained at the predetermined temperature for a predetermined duration so as to obtain a composite precursor; the composite precursor is subsequently heated up to 900° C., which makes phenolic resin and silane compound carbonized and decomposed; and the decomposition product is fired at 1300° C. for thermal reduction of silicon oxide with carbonized resin.

PRIOR ART DOCUMENTS

Patent Documents

Patent Document 1: Unexamined Japanese Patent Application Publication No. 2000-251896

Patent Document 2: Unexamined Japanese Patent Application Publication No. 2007-220411

SUMMARY OF THE INVENTION

Problems to be Solved by the Invention

However, since carbon blacks, including acetylene black, are fine particulates that generally exhibit hydrophobic properties, even if carbon blacks are suspended in purified water as in the technique described in Patent Document 1, uniformly dispersing carbon blacks in suspension is difficult. Moreover, even if acetylene black is adsorbed on the surfaces of silica powder, introducing acetylene black into the center portions of silica powder particulates is also difficult.

In the technique described in the above-mentioned Patent Document 1, acetylene black is prone to ubiquitously spread in the vicinity of the surfaces of silica powder particulates. Therefore, uniformly dispersing acetylene black inside of silica powder particulates has been difficult.

With the technique described in the above-mentioned Patent Document 2, the dispersibility of the electrically-conductive substance (carbon) is improved as compared to the technique described in Patent Document 1. However, the technique described in the above-mentioned Patent Document 2 does not include a step of gelling silica, and calcining is conducted at high temperature, which produces a material with less surface area and poor porosity.

In order to solve such problems, the inventors of the present case primarily aimed for providing high specific surface area, large pore volume, and high electrically-conductive properties by uniformly dispersing fine particulate carbon, exhibiting hydrophobic properties, into silica frames, and made an effort to achieve a technique that can carry out the objectives.

As a result, the inventors discovered the facts that porous silica-carbon composites can be obtained by a production method that is different from conventional methods, and that porous silica-carbon composites, obtained by such production method, become a material that exhibits excellent electrically-conductive properties. The discovery led the inventors to the completion of the present invention.

The present invention was completed based on the above-described knowledge, and one aspect of the present invention provides porous silica-carbon composites, having high specific surface area, large pore volume, and high electrically-conductive properties, while fine particulate carbon is uniformly dispersed into silica frames. Moreover, another aspect of the present invention provides a method of producing such porous silica-carbon composites.

Means for Solving the Problems

The following describes the framing adopted in the present invention.

A method of producing porous silica-carbon composites according to the present invention includes steps of: mixing fine particulate carbon dispersed in water by a surfactant, alkali metal silicate aqueous solution, and mineral acid so as to produce a co-dispersion in which silica hydrosol, produced by reaction of the alkali metal silicate and the mineral acid, and the fine particulate carbon are uniformly dispersed: and gelling silica hydrosol, contained in the co-dispersion, and making the co-dispersion into porous bodies having specific surface area from 20 to 1000 $m^2$/g, pore volume from 0.3 to 2.0 ml/g, and average pore diameter from 2 to 100 nm.

Moreover, porous silica-carbon composites according to the present invention are obtained by: mixing fine particulate carbon, dispersed in water by a surfactant, alkali metal silicate aqueous solution, and mineral acid so as to produce co-dispersion wherein silica hydrosol, produced by reaction of the alkali metal silicate and the mineral acid, and the fine particulate carbon are uniformly dispersed; and gelling the silica hydrosol, contained in the co-dispersion and making the co-dispersion into porous bodies. The porous silica-carbon composites according to the present invention have specific surface area from 20 to 1000 $m^2$/g, pore volume from 0.3 to 2.0 ml/g, and average pore diameter from 2 to 100 nm.

In the porous silica-carbon composites and the method of producing the same according to the present invention, porous silica-carbon composites to be ultimately obtained may or may not necessarily contain a surfactant. In a case wherein porous silica-carbon composites without a surfactant are required, the surfactant is removed by, after the co-dispersion is made into porous bodies, being exposed to calcining. In this case, the calcining is preferably conducted within a range of temperature condition from 200 to 500° C. and calcining duration from 0.5 to 2 hours.

In the porous silica-carbon composites and the method of producing the same according to the present invention, the co-dispersion is preferably produced such that the fine particulate carbon is added and mixed with one of the alkali metal silicate aqueous solution and the mineral acid, and subsequently added and mixed with another.

In the porous silica-carbon composites and the method of producing the same according to the present invention, the co-dispersion is preferably produced such that the alkali metal silicate aqueous solution and the mineral acid are mixed so as to obtain silica hydrosol, and the fine particulate carbon is subsequently added and mixed with the silica hydrosol.

In the porous silica-carbon composites and the method of producing the same according to the present invention, the porous silica-carbon composites to be ultimately obtained are preferably prepared such that carbon content becomes from 1 to 50%.

The following further describes the present invention in detail.

In the present invention, alkali metal silicate is used as the silica source. A major example of such silica source includes lithium silicate, potassium silicate, and sodium silicate, among which sodium silicate is the most preferable silica source for being easily available and economical.

The fine particulate carbon may be: carbon blacks including furnace black, channel black, acetylene black, thermal black, and so on; graphites including natural graphite, artificial graphite, expanded graphite, and so on; carbon fiber; carbon nanotube; and so forth.

These fine particulate carbon materials are highly hydrophobic and less dispersible in water, however easily become dispersible in water by a surfactant. A major example of such surfactant may include an anionic surfactant, a cationic surfactant, a non-ionic surfactant, and an ampholytic surfactant.

Commercially available fine particulate carbon that is dispersed in water may also be used. An Example of such commercial product includes LIONPASTE W-310A, LIONPASTE W-311N, LIONPASTE W-356A, LIONPASTE W-376R, and LIONPASTE W-370C (all manufactured by LION Corporation).

Since the surfactant is a component to be blended so as to disperse fine particulate carbon in water, the surfactant may be removed from porous silica-carbon composites to be ultimately obtained. Removal of a surfactant is preferable, particularly in a case wherein the surfactant affects the usage of the composites. The surfactant may be removed by, for example, after co-dispersion is made into porous bodies, being additionally exposed to calcining.

In this case, the calcining temperature and the calcining temperature may be appropriately adjusted within a range in which the physical property of porous silica-carbon composites is not greatly lost and the surfactant can be removed. However, calcining at extremely high temperature for an excessively long duration may cause a decrease in the surface area of porous bodies and reduction in the porosity. If such tendency is observed, calcining may be conducted preferably within the rage of temperature conditions from 200 to 500° C. and calcining durations from 0.5 to 2 hours.

Porous silica-carbon composite is preferably prepared such that carbon content becomes from 1 to 50% (desirably from 5 to 35%). If the carbon content is below 1%, providing sufficient electric conductivity tends to be difficult. On the other hand, if the carbon content exceeds 50%, the carbon content becomes too large for a silica framework, as a result of which the mechanical strength of porous bodies decreases and the porous bodies tend to be more easily cracked.

Adding water as well as a small amount of acid or alkali, which acts as a catalyst, to such co-dispersion makes alkali silicate hydrolyzed and forms colloidal silica, which is to be subsequently gelled. For the mineral acid, hydrochloric acid, sulfuric acid, nitric acid, carbonic acid, and so on may be used. Fine particulate carbon, dispersed in water by a surfactant, may be added to alkali silicate aqueous solution, to mineral acid, or to silica hydrosol obtained by mixing alkali metal silicate aqueous solution and mineral acid. However, depending on the physical property of the surfactant, adding the surfactant to mineral acid may cause property alteration of the surfactant. In order to avoid such property alteration, fine particulate carbon, dispersed in water by a surfactant, should preferably be dispersed either in alkali silicate aqueous solution or silica hydrosol.

When co-dispersion is made into porous bodies, the porous bodies are prepared so as to have a surface area from 20 to 1000 $m^2$/g (desirably from 100 to 800 $m^2$/g), a pore volume from 0.3 to 2.0 mug (desirably from 0.3 to 1.5 ml/g), and an average pore diameter from 2 to 100 nm (desirably from 2 to 30 nm). If porosity is lower than the porosity of the porous bodies that is indicated by such value ranges, the effect of being porous bodies becomes small. Increasing the porosity higher than the porosity of the porous bodies that is indicated by such value ranges does not provide any practical advantages.

In the porous silica-carbon composites according to the present invention that can be obtained as above, fine particulate carbon is uniformly dispersed inside of gelled silica (silica gel).

Silica gel is a porous material, consisting mainly of $SiO_2$ and having high surface area and large volume in the internal space thereof (pore volume), and is widely used, such as for an absorbent, a catalyst, a matting agent for paint, a filler for resin, and so on. However, such inorganic oxide generally has poor electrically-conductive properties.

The present invention, on the other hand, achieves a porous material having electrically-conductive properties by uniformly dispersing fine particulate carbon inside of silica gel. As a result, compared to a material that does not go through a gelling step and becomes non-porous, the present invention can provide a porous material with high specific surface area, large pore volume, and high electrically-conductive properties.

Therefore, a porous material with electrically-conductive properties, such as the porous silica-carbon composites according to the present invention, has a lot of potential for various new applications. The porous silica-carbon composites according to the present invention are expected to be used in various new applications, such as for an anode material or a cathode material for secondary batteries, or for a material for a catalytic reaction in which electrochemical reaction is used.

MODE FOR CARRYING OUT THE INVENTION

The following describes embodiments of the present invention by way of example.

Embodiment 1

1.7 g of a non-ionic surfactant (product name: DISPARLON AQ-380, manufactured by Kusumoto Chemicals, Ltd.) and 10 g of carbon black (product name: VALCAN XC-72, manufactured by Cabot Corporation) were added to 35.5 g of deionized water and well agitated so as to obtain carbon-black dispersion solution.

12 g of dilute sulfuric acid (6 mol/L) and 78 g of sodium silicate with silica concentration 25% were mixed, and 100 g of silica sol was obtained, to which the above-described carbon-black dispersion solution was added and further well agitated.

When the entire mixture became solid gel (hydrogel), the hydrogel was broken down approximately to a size of 1 $cm^3$ and subjected to 5 times of batch cleaning with 1 L of deionized water.

To the cleaned hydrogel, 1 L of deionized water was added, and the pH value was adjusted to 10 with aqueous ammonia. Heating was subsequently conducted at 85° C. for 8 hours. After solid-liquid separation took place, drying was conducted at 180° C. for 10 hours. In the present embodiment, calcining was additionally conducted at 350° C. for 2 hours in order to remove the surfactant. As a result, 26.8 g of porous silica-carbon composites was obtained. It is to be noted that calcining may be conducted if necessary, and whether or not to conduct calcining may be arbitrary determined.

Values for the physical property of the sintered product, obtained by nitrogen adsorption measurement, were as follows: specific surface area 530 $m^2/g$, pore volume 0.58 ml/g, average pore diameter 4.3 nm, and carbon content by percentage 29.8% (measured by an elemental analyzer "Vario EL III" [manufactured by Elementar Analysensysteme GmbH]).

Embodiment 2

A similar procedure was conducted as in Embodiment 1, except that 1.2 g of an anionic surfactant (product name: OROTAN SN, manufactured by The Dow Chemical Company) was used alternatively to the non-ionic surfactant. As a result, 26.8 g of porous silica-carbon composites was obtained.

Values for the physical property of the sintered product, obtained by nitrogen adsorption measurement, were as follows: specific surface area 327 $m^2/g$, pore volume 0.90 ml/g, average pore diameter 11.0 nm, and carbon content by percentage 32.3% (measured by an elemental analyzer "Vario EL III" [manufactured by Elementar Analysensysteme GmbH]).

Embodiment 3

A similar procedure was conducted as in Embodiment 1, except that 62 g of commercially available carbon-black dispersion solution (product name: LIONPASTE W-311N, manufactured by LION Corporation). As a result, 24.2 g of porous silica-carbon composites was obtained.

Values for the physical property of the sintered product, obtained by nitrogen adsorption measurement, were as follows: specific surface area 412 $m^2/g$, pore volume 1.11 ml/g, average pore diameter 10.8 nm, and carbon content by percentage 23.8% (measured by an elemental analyzer "Vario EL III" [manufactured by Elementar Analysensysteme GmbH]).

Embodiment 4

1.7 g of a non-ionic surfactant (product name: DISPARLON AQ-380, manufacture by Kusumoto Chemicals Ltd.) and 8 g of carbon black (product name: VALCAN XC-72, manufactured by Cabot Corporation) were added to 64 g of deionized water and agitated. To this mixture, 80 g of sodium silicate No. 3 was added and well agitated so as to obtain a carbon-black dispersion solution.

While 110 g of 1.25 mol/L dilute sulfuric acid was vigorously agitated, the carbon-black dispersion solution was gradually added so as to produce silica sol. The obtained silica sol was poured into an airtight container, heated at 80° C. for 3 hours, and hydrogel was obtained. The subsequent procedure was conducted in the same manner as in Embodiment 1, and 30.4 g of porous silica-carbon composites was obtained.

Values for the physical property of the sintered product, obtained by nitrogen adsorption measurement, were as follows: specific surface area 348 $m^2/g$, pore volume 0.96 ml/g, average pore diameter 11.0 nm, and carbon content by percentage 24.9% (measured by an elemental analyzer "Vario EL III" [manufactured by Elementar Analysensysteme GmbH]).

Embodiment 5

Although calcining was conducted at 350° C. for 2 hours in Embodiment 1, this calcining step was omitted and the other part of the procedure was conducted in the same manner as in Embodiment 1. As result, 28.4 g of porous silica-carbon composites was obtained.

Values for the physical property of the non-fired product, obtained by nitrogen adsorption measurement, were as follows: specific surface area 521 $m^2/g$, pore volume 0.57 ml/g, average pore diameter 4.4 nm, and carbon content by percentage 31.2% (measured by an elemental analyzer "Vario EL III" [manufactured by Elementar Analysensysteme GmbH]).

Embodiment 6

Although calcining was conducted at 350° C. for 2 hours in Embodiment 1, this calcining condition was changed so as to conduct the calcining step at 500° C. for hours, and the other part of the procedure was conducted in the same manner as in Embodiment 1. As a result, 19.5 g of porous silica-carbon composites was obtained.

Values for the physical property of the sintered product, obtained by nitrogen adsorption measurement, were as follows: specific surface area 492 $m^2/g$, pore volume 0.56 ml/g, average pore diameter 4.6 nm, and carbon content by percentage 9.8% (measured by an elemental analyzer "Vario EL III" [manufactured by Elementar Analysensysteme GmbH]).

Embodiment 7

0.2 g of a non-ionic surfactant (product name: DISPARLON AQ-380, manufactured by Kusumoto Chemicals, Ltd.) and 1.0 g of carbon black (product name: VALCAN XC-72, manufactured by Cabot Corporation) were added to 35.5 g of deionized water and well agitated so as to obtain carbon-black dispersion solution. A similar procedure was conducted as in Embodiment 1, except that this carbon-black dispersion solution was used. As a result, 20.5 g of porous silica-carbon composites was obtained.

Values for the physical property of the sintered product, obtained by nitrogen adsorption measurement, were as follows: specific surface area 273 $m^2/g$, pore volume 1.13 ml/g, average pore diameter 16.4 nm, and carbon content by percentage 3.9% (measured by an elemental analyzer "Vario EL III" [manufactured by Elementar Analysensysteme GmbH]).

[Conductive Property Evaluation]

0.1 g of PTFE powder (3 μm) was added, as a binder, to 0.9 g of each test powder obtained from Embodiment 1 to Embodiment 7, and mixed well with an agate mortar. Subsequently, a small amount of deionized water was added to each mixture and further mixed well.

Each of the mixture was compressed and molded at 1100 $kg/cm^3$ by a tablet molding dice having 10 mm in diameter, and then sufficiently dried on a hotplate set to 120° C. so as to obtain samples, each having 1.0 mm in thickness and 10.0 mm in diameter, for electrically-conductive property evaluation. The electrically-conductive property was evaluated by conductive property (S/cm) according to the four-point probe method by using a resistivity meter Loresta-GP (manufactured by Mitsubishi Chemical Analytech, Ltd.).

Measurement results are shown in Table 1 presented below.

TABLE 1

| | SPECIFIC SURFACE AREA ($m^2/g$) | PORE VOLUME (ml/g) | CARBON CONTENT BY PERCENTAGE (%) | ELECTRICAL CONDUCTIVITY (S/cm) |
|---|---|---|---|---|
| EMBODIMENT 1 | 530 | 0.58 | 29.8 | $3.30 \times 10^{-1}$ |
| EMBODIMENT 2 | 327 | 0.90 | 32.3 | $2.76 \times 10^{-1}$ |
| EMBODIMENT 3 | 412 | 1.11 | 23.8 | $1.51 \times 10^{-1}$ |
| EMBODIMENT 4 | 348 | 0.96 | 24.9 | $2.13 \times 10^{-1}$ |
| EMBODIMENT 5 | 521 | 0.57 | 31.2 | $1.84 \times 10^{-1}$ |
| EMBODIMENT 6 | 492 | 0.56 | 9.8 | $2.99 \times 10^{-2}$ |
| EMBODIMENT 7 | 273 | 1.13 | 3.9 | $2.68 \times 10^{-4}$ |

As is clear from Table 1 shown above, the porous silica-carbon composites according to Embodiment 1 to Embodiment 7 exhibit high specific surface area, large pore volume, and high electrically-conductive properties.

[Modifications]

Although the above has described embodiments of the present invention, the present invention is not limited to one specific embodiment described above and may be carried out in various ways.

The above-described embodiments have presented some examples wherein a non-ionic surfactant, an anionic surfactant, and commercially available carbon-black dispersion solution containing a surfactant are respectively used. However, the surfactant is not limited to these examples. Some other types of surfactant, for example, a cation surfactant or an ampholytic surfactant, may be alternatively used as long as the surfactant enables to disperse carbon, such as carbon black, which is hydrophobic and in the form of fine particulate, in water.

Moreover, the above-described embodiments have presented some examples wherein calcining is conducted at specific calcining temperatures and for specific calcining duration. The calcining temperature and calcining duration, however, may be arbitrarily adjusted. It is to be noted that, since calcining at extremely high temperature for a long duration may negatively affect the physical property of end products (particularly the porosity), calcining temperature and duration are preferably selected within a range in which such negative influence is not created. The range that the inventors have confirmed by experiment is, for example, calcining temperature from 200 to 500° C. and calcining duration from 0.5 to 2 hours. In a case wherein calcining was conducted within this range, end products had good physical properties.

It goes without saying that, in a case wherein a surfactant contained in end products does not cause problems, determination whether or not to include a calcining step can be arbitrarily made, and that the calcining step may be omitted as in the above-described Embodiment 5, for example.

The invention claimed is:

1. A method of producing porous silica-carbon composites, the method comprising:

mixing fine particulate carbon dispersed in water by a surfactant, alkali metal silicate aqueous solution, and mineral acid so as to produce a co-dispersion in which silica hydrosol, produced by reaction of the alkali metal silicate and the mineral acid, and the fine particulate carbon are uniformly dispersed; and gelling the silica hydrosol, contained in the co-dispersion, and making the co-dispersion into porous bodies having specific surface area from 20 to 1000 $m^2$/g, pore volume from 0.3 to 2.0 ml/g, and average pore diameter from 2 to 100 nm, wherein a carbon content of the porous silica-carbon composites is from 1 to 50%, wherein the porous silica carbon composite comprise fine particulate carbon dispersed inside a silica gel.

2. The method of producing porous silica-carbon composites according to claim 1 further comprising, subsequently to the step of making the co-dispersion into porous bodies, a step of calcining the porous bodies so as to remove the surfactant.

3. The method of producing porous silica-carbon composites according to claim 2, wherein the calcining is conducted within a range of temperature condition from 200 to 500° C. and calcining duration from 0.5 to 2 hours.

4. The method of producing porous silica-carbon composites according to claim 1, wherein the step of producing the co-dispersion is conducted such that the fine particulate carbon is added and mixed with one of the alkali metal silicate aqueous solution and the mineral acid, and subsequently added and mixed with the other one of the alkali metal silicate aqueous solution and the mineral acid.

5. The method of producing porous silica-carbon composites according to claim 1, wherein the step of producing the co-dispersion is conducted such that the alkali metal silicate aqueous solution and the mineral acid are mixed so as to obtain silica hydrosol, and the fine particulate carbon is subsequently added and mixed with the silica hydrosol.

* * * * *